Nov. 18, 1924.                                                    1,515,914
                              G. A. UNGAR
                      APPARATUS FOR TESTING LUBRICANTS
                          Filed July 19, 1922       3 Sheets-Sheet 2
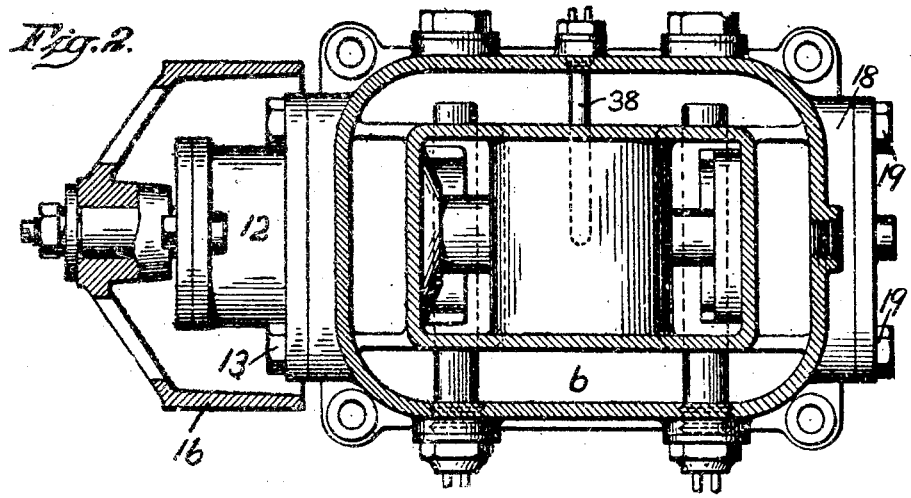
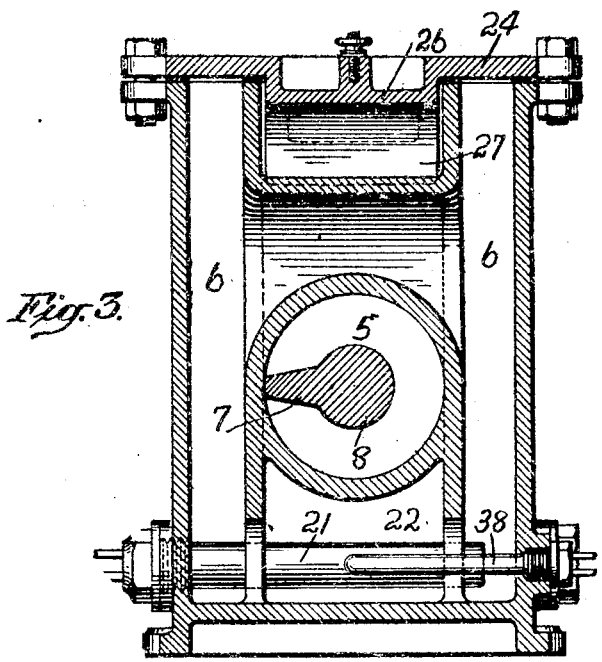
INVENTOR
Gustav A. Ungar
BY
Archibald Cox
his ATTORNEY

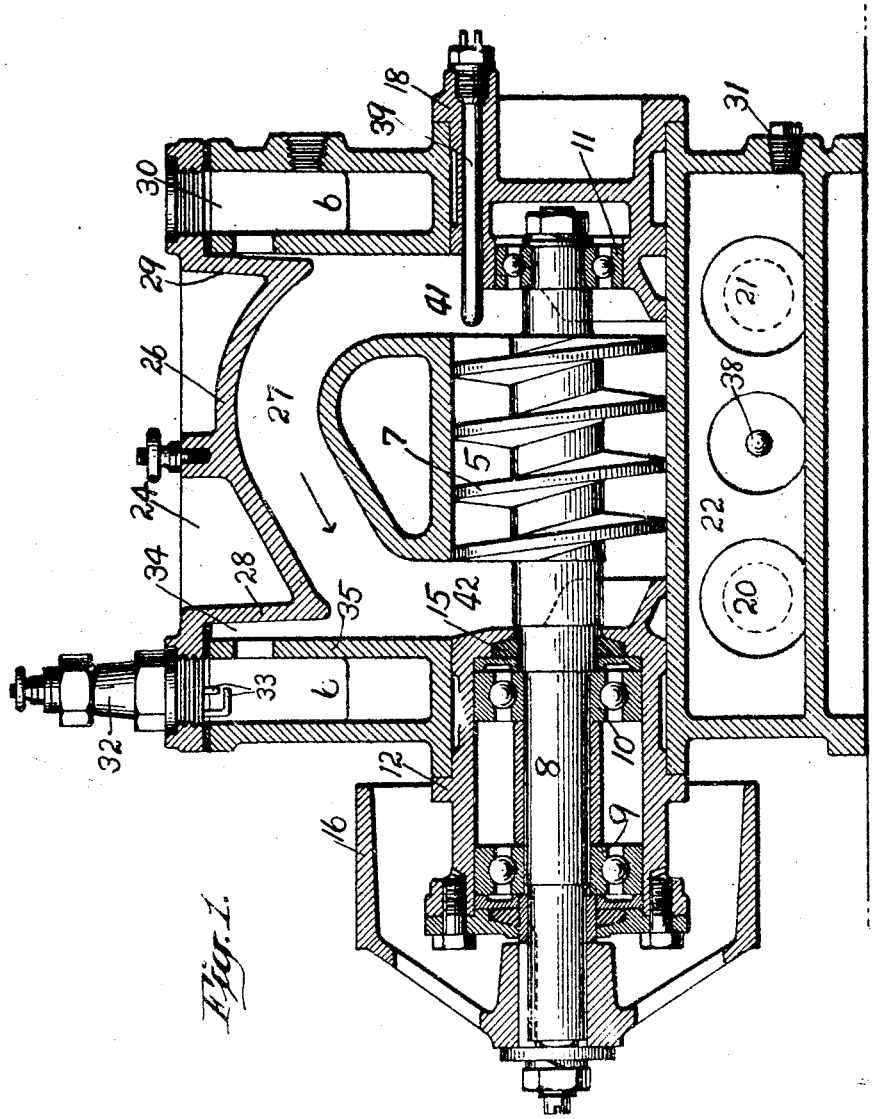

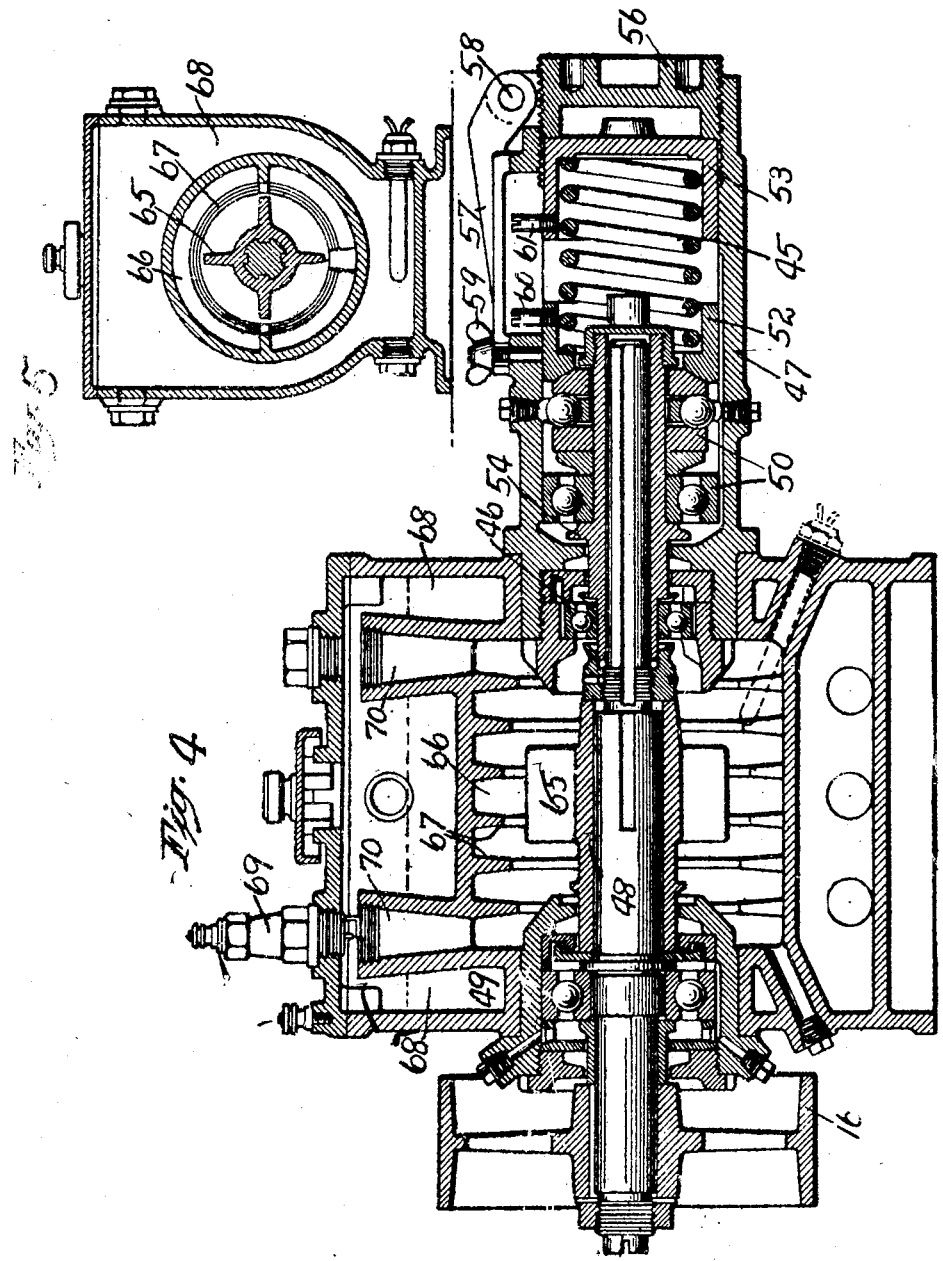

Patented Nov. 18, 1924.

1,515,914

UNITED STATES PATENT OFFICE.

GUSTAVE A. UNGAR, OF PELHAM MANOR, NEW YORK, ASSIGNOR TO JOSEPH DIXON CRUCIBLE COMPANY, OF JERSEY CITY, NEW JERSEY, A CORPORATION OF NEW JERSEY.

APPARATUS FOR TESTING LUBRICANTS.

Application filed July 19, 1922. Serial No. 575,945.

*To all whom it may concern:*

Be it known that I, GUSTAVE A. UNGAR, a citizen of the United States, residing in Pelham Manor, in the county of Westchester and State of New York, have invented certain new and useful Improvement in Apparatus for Testing Lubricants, of which the following is a specification.

The invention relates to an apparatus for testing lubricants, such as lubricating oils and greases.

The object of the invention is produce an apparatus having provision for subjecting the lubricant to the effects of mechanical agitation or friction, varying degrees of temperature, moisture and ozone, so that the qualities of the lubricant may be determined within a relatively short time without the necessity of subjecting it to actual service tests, which are often long drawn out and expensive, and for that reason unsatisfactory. The intensive effect of the various agents to which the lubricant is subjected will speedily produce chemical changes in inferior lubricants. Thus a chemical analysis of the lubricant which has been tested will determine whether there has been any increase in the content of free acid and alkali and whether any hardening or gumming of the lubricant is noticeable. It is of especial importance to determine these facts with respect to lubricants used for roller or anti-friction bearings. Accordingly, means are provided in the apparatus for subjecting an anti-friction bearing to direct contact with the lubricant being tested. The lubricant testing apparatus of the present invention is more fully described in the following specification and is particularly pointed out in the appended claims.

In the accompanying drawings illustrating the invention, Fig. 1 is a vertical longitudinal section through substantially the middle of one form of the lubricant testing apparatus; Fig. 2 is a horizontal section through the upper part of the apparatus shown in Fig. 1; Fig. 3 is a vertical transverse section through substantially the middle of the apparatus; Fig. 4 is a view similar to Fig. 1 of a modified form of apparatus; and Fig. 5 is a vertical transverse section through the lubricant chamber of the apparatus shown in Fig. 4.

The improved apparatus for testing lubricants, as illustrated in the drawings, comprises means for subjecting the lubricant, such as oil or grease, to mechanical friction or agitation. Slightly different means will be employed for agitating or stirring oils and greases. Means are also provided for subjecting the lubricant to a predetermined amount of heat or cold, moisture and ozone during the period of agitation. These means are provided for determining within a relatively short time the effect of the usual factors to which lubricants are subjected in actual service.

The lubricant being tested is placed in a closed chamber where it is subjected to mechanical friction and stirring. This chamber 5 is surrounded by a suitable arranged water jacket 6, the construction of which is clearly indicated in the drawings and does not require a detailed description thereof. The water jacket may be filled with water, brine or other liquid for the purpose of subjecting the lubricant to the effects of heat or cold according to the nature of the lubricant or the purpose in view. If the lubricant being tested is a grease, it has been found desirable to test it in an apparatus constructed as indicated in Fig. 1. If the lubricant to be tested is oil, an apparatus constructed as shown in Fig. 4 will be used. These two apparatus both subject the lubricant to mechanical agitation and friction, to the effects of heat or cold, moisture and ozone, but differ somewhat in the mode of subjecting the lubricant to these factors. For convenience of description the apparatus shown in Fig. 1 will be described first.

The lubricating grease to be tested in the apparatus shown in Fig. 1 is subjected to the required mechanical agitation or stirring by means of a spiral 7 mounted on a shaft or spindle 8 journaled at one end in the anti-friction bearings 9 and 10 and at the other end in the anti-friction bearing 11. The bearings 9 and 10 are supported in a casing 12 secured to one end of the frame of the apparatus by means of cap screws 13. The casing 12 is entirely enclosed and the lubricant for the bearings 9 and 10 is not permitted to mingle with the lubricant undergoing the test. For this purpose a gasket 15 is provided. This construction of the means for supporting the spindle 10 permits the removal of the spiral from the apparatus simply by unscrewing the cap screws 13. The spiral may be removed without disturbing the bearings 9 and 10. The spindle is provided at one end with a pulley 16 which is driven from any suitable source of power.

The anti-friction bearing 11 is mounted on the inner end of a casing 18 secured to the rear end of the apparatus by means of cap screws 19. Bearing 11 is so located as to be exposed to and thus lubricated by the grease undergoing the test. This construction makes it possible to examine the effects of the test on the grease by removing the bearing 11 without dismantling the rest of the apparatus.

The water jacket entirely surrounds the chamber 5, except at its top side. A convenient medium for conveying heat to the lubricant being tested in water, because this medium also furnishes the necessary moisture. When the lubricant is subjected to the effects of cold, it will be convenient to circulate brine in the water jacket. Other media for controlling the temperature of the lubricant being tested may be employed. Various sources of heat may be used. In the illustrated apparatus two electric heating coils 20 and 21 are located in the bottom section 22 of the water jacket. The chamber 5 and the water jacket are closed at their top side by means of a cover 24, the depressed middle portion 26 of which constitutes the upper side of a U-shaped passage 27 connected at each end with the chamber 5. The ends 28 and 29 of the depressed portion 26 of the cover are so arranged as to permit vapor from the water jacket 6 to pass into the chamber 5 and at the same time to prevent the lubricating grease circulating in passage 27 from passing into the water jacket. Liquid is placed in the water jacket through the opening 30, which may be closed by a plug. The used liquid may be drawn off through the plug-closed hole 31.

In order to subject the lubricant to the effects of ozone, a suitable spark plug 32 is mounted in one end of the cover with its poles 33 projecting down into the water jacket, but above the level of the liquid therein. The spark plug may be supplied with electricity from either a magneto or an ignition system. To permit the air impregnated with ozone to circulate freely and thus bring the ozone in contact with the lubricant, a space 34 is left between the end 28 of the cover 24 and the wall 35 of the water jacket. There is no liability of the lubricant passing through the space 34 into the water jacket, because the lubricant circulates in the passageway 27 in the direction of the arrow. The temperature of the liquid in the water jacket and the temperature of the lubricant in the chamber 5 may be determined by providing suitable openings in which are located the thermometers or thermo-couplers 38 and 39.

When the apparatus, as illustrated in Fig. 1, is to be used to test the lubricating qualities of a particular grease, a definite quantity of the grease is inserted in the chamber 5. This may be done by removing the bearing casings 12 and 18. The liquid in the water jacket is then brought to the desired test temperature, either high or low, which temperature should be maintained constantly during the test. The spark plug is then set in operation and power is applied to the spindle. The rotation of the spiral forces the grease into the U-shaped passageway 27 through the discharge opening 41 and the lubricant returns to the cylindrical part of the chamber 5 through the inlet opening 42. Thus there is a complete circulation of the lubricant in the chamber 5. During the test the lubricant is maintained at the requisite temperature and is subjected to air saturated with moisture and ozone. Thus the lubricant being tested undergoes the effects of the factors which play the largest part in actual service.

It is sometimes desirable to study the effect of a load upon the test bearing, inasmuch as the effects upon the lubricant are likely to be different than when no load is carried. For this purpose the test bearing is subjected to a thrust load, the amount of which may be varied according to conditions. A convenient means for securing this result is shown in Fig. 4 where the apparatus is provided with a coil spring 45 arranged to exert a load upon the test bearing 46, which corresponds to the test bearing 11 of Fig. 1. The spring 45 is housed in a casing 47 removably secured to the end of the apparatus. In this modified form of apparatus the shaft or spindle 48 is supported at both ends, the single bearing at one end being indicated at 49 and double bearings, located in the casing 47, being indicated at 50. Whether the spindle arrangement shown in Fig. 1 or the arrangement shown in Fig. 4 will be employed, will depend upon the nature of the lubricant being tested and the character of the test.

The forward end of the spring 45 presses against a head 52 and the rear end of the spring is engaged by the cap 53. The pressure of the spring is communicated to the bearing 46 through the head 52 and the sleeve 54 upon which the bearings 50 are mounted. In order that the thrust load, imposed upon the bearing 46 by the spring 45, may be varied according to conditions, an externally threaded nut 56 is received in the rear open end of the casing 47. A slotted finger 57 pivoted at 58 on the nut 56 and arranged so that its free end is detachably held by the fly-nut 59 holds the nut 56 in adjusted position. The pins 60 and 61 which are respectively secured in the head 52 and the cap 53, are adapted to be received in the slotted finger 57 and to indicate by their distance apart the amount the spring 45 has been compressed. The spring may thus be accurately calibrated. The thrust is suitable for the purpose of subjecting the test bearing to a load, because it is destructive upon the ball bearing and because it conduces to simplicity of design.

Where the lubricant to be tested is an oil, it has been found that the mechanical agitation and stirring requisite to secure the desired degree of friction, can be secured by using a paddle wheel, as indicated at 65 in Fig. 4. The paddle wheel serves only to agitate or stir the oil within the chamber 66 without imparting a circulatory movement thereto, as is the case where grease is being tested. The churning effect on the oil within the chamber 66 may be increased by providing a series of inwardly projecting ribs 67. These ribs 67 also serve to intensify the temperature effects, either hot or cold. For some tests the ribs may be omitted. The chamber 66 is surrounded by a water jacket 68 which corresponds to the water jacket 6 of Fig. 1. The ozone is produced by the spark plug 69. The chamber 66 is charged through the passages 70 which are high enough to prevent the oil from being splashed into the water jacket. In its other features of construction, the apparatus shown in Fig. 4 does not differ materially from the apparatus shown in Fig. 1.

When the test to which the lubricant, whether grease or oil, is subjected has been carried on for the requisite length of time, the top and the end covers of the apparatus are removed so that the lubricant may be thoroughly investigated as to any possible chemical changes which may have taken place, and so that the effects of the lubricant upon the test ball-bearings may be determined. Before making another test with another kind of lubricant, the various parts of the apparatus with which the lubricant has been in contact are thoroughly cleaned with a suitable solvent.

By taking frequent readings of the power required to turn the spindle it is possible to arrive at accurate relative values with respect to the consistency, at various temperatures, of the lubricant being tested. This is of especial value in the case of different oils, particularly when the oil is in a semi-plastic condition or when it has ceased to flow. It is thus possible to compare satisfactorily the consistencies of different lubricants. It will be obvious that various other and different kinds of tests on lubricants, whether grease or oil, may be carried out in the present apparatus.

Many modifications in the construction and arrangement of the various parts of the lubricant testing apparatus may be made and which will be determined partly by the character of the lubricant to be tested and partly by the temperature range for which investigation is desired.

Having thus described the invention what I claim as new is:—

1. An apparatus for testing lubricants and the like comprising a chamber adapted to contain the lubricant to be tested, means for mechanically stirring the lubricant, and means for subjecting the lubricant to the effects of ozone produced by an electric spark.

2. An apparatus for testing lubricants and the like comprising a chamber adapted to contain the lubricant to be tested, and means for subjecting the lubricant to the effects of mechanical friction, heat, moisture and electricity.

3. An apparatus for testing lubricants and the like comprising means for agitating the lubricant in an enclosed space, means for regulating the temperature of the lubricant, and means for subjecting the lubricant to the effects of moisture and electricity according to the requirements of the test.

4. An apparatus for testing lubricants and the like comprising a chamber adapted to contain the lubricant to be tested, means for agitating the lubricant, means for controlling the temperature of the lubricant, means for exposing the lubricant to a predetermined degree of moisture, and means for subjecting the lubricant to the effect of ozone.

5. An apparatus for testing lubricants and the like comprising a chamber adapted to contain the lubricant to be tested, means for subjecting the lubricant to the effects of mechanical friction and agitation, and means for subjecting the lubricant to the effects of moisture.

6. An apparatus for testing lubricants and the like comprising a chamber adapted to contain the lubricant to be tested, means for agitating the lubricant, and a bearing connected with the agitating means and mounted in the chamber so as to be in contact with the lubricant being tested.

7. An apparatus for testing lubricants and the like comprising a chamber adapted to contain the lubricant to be tested, means for agitating the lubricant, a bearing connected with the agitating means and mounted in the chamber so as to be in contact with the lubricant being tested, and means for imposing a load on the bearing.

8. An apparatus for testing lubricants and the like comprising a chamber adapted to contain the lubricant to be tested, means for stirring the lubricant, means for introducing moisture into the chamber, and means for causing an electric spark in the chamber.

9. An apparatus for testing lubricants and the like comprising a chamber adapted to contain the lubricant to be tested, agitating means mounted in the chamber for subjecting the lubricant to mechanical agitation and friction, a hollow jacket enclosing the chamber and adapted to contain liquid, there being an open passage between the chamber and the jacket, means for controlling the temperature of the liquid contents of the jacket, and means for causing an electric spark in the chamber.

10. An apparatus for testing lubricants and the like comprising a chamber adapted to contain the lubricant to be tested, a hollow jacket surrounding the chamber and adapted to contain liquid, means for regulating the temperature of the liquid, means for causing an electric spark in the chamber, a shaft extending through the chamber, means mounted on the shaft for stirring the lubricant, a test bearing connected with the shaft and mounted in the chamber so as to be in contact with the lubricant being tested, and means for imposing a thrust load upon the bearing mounted in the chamber.

11. An apparatus for testing lubricants and the like comprising a chamber adapted to contain the lubricant to be tested, a shaft extending through the chamber, means mounted on the shaft for stirring the lubricant, a ball bearing connected with the shaft and mounted in the chamber so as to be in contact with the lubricant being tested, a spring arranged to exert its pressure upon the ball bearing mounted in the chamber, and means for regulating the tension of the spring.

GUSTAVE A. UNGAR.